(12) United States Patent
Yamanaka

(10) Patent No.: US 7,461,950 B2
(45) Date of Patent: Dec. 9, 2008

(54) FIELD SEQUENTIAL LIGHTING DEVICE AND IMAGE PROJECTING DEVICE

(75) Inventor: Kazuya Yamanaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 163 days.

(21) Appl. No.: 11/254,928

(22) Filed: Oct. 20, 2005

(65) Prior Publication Data

US 2006/0087847 A1    Apr. 27, 2006

(30) Foreign Application Priority Data

Oct. 22, 2004    (JP) .............................. 2004-308273

(51) Int. Cl.
 *F21V 7/04*    (2006.01)
(52) U.S. Cl. ...................................... 362/293; 362/281
(58) Field of Classification Search .................. 362/293, 362/281

See application file for complete search history.

(56) References Cited

U.S. PATENT DOCUMENTS

| | | | | |
|---|---|---|---|---|
| 4,800,474 A | * | 1/1989 | Bornhorst | 362/293 |
| 6,971,758 B2 | * | 12/2005 | Inui et al. | 362/602 |
| 7,050,120 B2 | * | 5/2006 | Allen et al. | 348/742 |
| 7,198,384 B2 | * | 4/2007 | Kakiuchi et al. | 362/293 |

FOREIGN PATENT DOCUMENTS

JP    2002-90883    3/2002

* cited by examiner

*Primary Examiner*—Anabel M Ton
(74) *Attorney, Agent, or Firm*—Volpe and Koenig, P.C.

(57) ABSTRACT

A field sequential lighting device for emitting light corresponding to a plurality of colors using a field sequential method includes: a light source; and a light converting section for intensifying the emitted light by sequentially converting the light, emitted from the light source, corresponding to the plurality of colors. By doing this, it is possible to provide a field sequential lighting device using the light emitted from the light source efficiently and having desirable color reproducibility, and an image projecting device having it.

25 Claims, 9 Drawing Sheets

FIELD SEQUENTIAL LIGHTING DEVICE AND IMAGE PROJECTING DEVICE

BACKGROUND OF THE INVENTION

1. Field of the Invention

The present invention relates to a field sequential lighting device for emitting light corresponding to a plurality of colors sequentially, and an image projecting device having the lighting device.

The present application is based on a Japanese patent application filed with the Japanese Patent Office on Oct. 22, 2004 (Japanese Patent Application No. 2004-308273) and incorporates by reference its contents.

2. Description of Related Art

Recently, lighting devices for emitting light in a plurality of specific colors (wavelengths) have been proposed which have a light source for emitting white color light and a color wheel formed by disposing trimming (color) filters, through which light corresponding to specific wavelengths of colors, i.e., red (R), green (G), and blue (B) can be transmitted, on divided sections on a rotatable plate so that the light emitted from the light source corresponding to each color R, G, and B can be emitted sequentially by rotating the color filters. In general, single-plate field sequential image projecting devices (projectors) and endoscope devices use such lighting devices for emitting a plurality of colors sequentially.

In such single-plate field sequential image projecting devices, the light corresponding to each color, i.e., R, G, and B, is converted by spatial modulating elements, e.g., transmissive LCDs so that the modulated colors represent image information corresponding to R, G, and B during a lighting period, and each of R, G, and B is superimposed over time; thus, such a structure enables color display. In addition, single-plate field sequential image projecting devices use discharging lamps, i.e., ultra-high pressure mercury lamps, as light sources in the projectors because the discharging lights can form a point source of light with high emission intensity. With respect to spectrums, lights emitted from such ultra-high pressure mercury lamps has several characteristic bright lines which are unique to mercury. As shown in FIG. 11, many of the bright lines have peaks in the blue to ultra-violet region, and they do not exist in a red-color region. Therefore, as shown in FIG. 12, an intensity of the R-light (red-colored light) is weak in such conventional ultra-high pressure mercury lamps; thus, color reproducibility of the R-light is not sufficient. As a result of this, in order to realize adequate white balance, it is necessary to weaken intensities of the G and B lights relatively.

With respect to such characteristics of the light spectrum, UV cutting filters are disposed between a reflector for concentrating light emitted from the lamp and the spatial modulating element in order to protect human bodies and liquid crystals from damage caused by the UV light. Also, in order to prevent damage caused by heat, IR (Infrared Ray) filters are disposed. By doing this, visible white light can be emitted by cutting out light at wavelengths of 420 nm or less, and light at wavelengths of 720 nm or greater. The white light is transmitted through the color filters having filtering properties of R, G, and B colors shown in FIG. 11 and formed on the rotating color wheel. As a result of this structure, the field sequential lighting operation of the colors, i.e., R, G, and B is available as shown in FIG. 12.

On the other hand, lighting devices having wavelength converting elements have been proposed for adjusting color balances in lighting devices, e.g., ultra-high pressure mercury lamps used in projectors (see Japanese Unexamined Patent Application, First Publication No. 2002-90883). The lighting device used in projectors disclosed in this publication is used for improving color balance in order to supplement the red color by inserting wavelength converting elements for changing the wavelength of ultra-violet rays into the wavelength of visible light (in particular, red light) because light emitted light from the ultra-high pressure mercury light inevitably lacks in red color.

SUMMARY OF THE INVENTION

An object of the present invention is to provide a field sequential lighting device and an image projecting device which enable efficient use of light emitted from light sources and desirable color reproducibility.

In order to achieve the above object, the present invention proposes the following aspects.

The field sequential lighting device according to the present invention, for emitting lights corresponding to a plurality of colors using a field sequential method, includes: a light source; and a light converting section for intensifying light emitted from the light source, corresponding to the plurality of colors by sequentially converting the lights.

In this aspect of the present invention, the light emitted from the light source is made incident into the light converting section, and the incident light is emitted corresponding to colors converted by the light converting section. By doing this, the intensity of the light corresponding to each color emitted from the light converting section is so strong that it is possible to generate light having great luminous energy; therefore, it is possible to generate light having desirable color rendering properties.

Also, the field sequential lighting device according to the present invention may further include a color selecting section disposed between the light converting section and an object to cause reception of the emitted light, the color selecting section being operable synchronously with the light converting section.

In this aspect of the present invention, the light transmitted through the light converting section is made incident into the color selecting section. By doing this, the light having colors intensified by the light converting section are transmitted through the color selecting section which is operable synchronously with the light converting section; therefore, it is possible to intensify the light while purifying it. Therefore, it is possible to generate light having sufficient brightness (luminous energy) and color reproducibility reliably.

Also, in the field sequential lighting device according to the present invention, the color of the light converted by the light converting section and the color selected by the color selecting section may coincide.

In this aspect of the present invention, the light transmitted through the light converting section is made incident into the color selecting section. By doing this, the light intensified by the light converting section coincide with the colors selected by the color selecting section. Therefore, it is possible to intensify the light while purifying it by transmitting the light through the color selecting section. Therefore, it is possible to generate light having sufficient brightness (luminous energy) and color reproducibility reliably.

Also, in the field sequential lighting device according to the present invention, spectrum of the light emitted from the light source may correspond to specific colors having bright lines, and the specific bright lines be converted into other bright lines by the light converting section.

In this aspect of the present invention, the specific color bright lines can be converted to other specific bright lines;

therefore it is possible to generate light having bright lines corresponding to desirable colors.

Also, in the field sequential lighting device according to the present invention, the light source may emit UV light, visible light, and IR light, and the light converting section converts at least either of the UV light and the IR light into different visible light.

By doing this, at least either ones of UV light and IR light is converted into visible light by the light converting device; therefore, it is possible to improve efficiency in use of the light emitted from the light source. That is, it is possible to use not only visible light but also non-visible lights; therefore, all of the light emitted can be used with no waste.

Also, in the present invention, the light converting section may convert specific visible light included in the plurality of colors into other visible light having different colors from the unconverted specific visible light.

In this aspect of the present invention, a light source having a specific wavelength bandwidth is used; therefore, it is possible to convert the light into visible light having wavelengths corresponding to desirable colors. Therefore, it is not necessary to provide additional light sources corresponding to a plurality of colors; thus, the light source can be simplified in structure, and thereby, costs of the lighting device reduced.

Also, in the field sequential lighting device according to the present invention, the light source may be a discharging lamp having a plurality of bright lines.

In this aspect of the present invention, it is possible to restrict diffusion of the emitted light by use of the discharging lamp; therefore, it is possible to realize light having efficient luminosity and desirable color reproducibility.

Also, in the field sequential lighting device according to the present invention, the light source may emit light having a single wavelength.

Also, in the field sequential lighting device according to the present invention, the light source may emit UV light.

Also, in the field sequential lighting device according to the present invention, the light source may emit blue-color light.

In these aspects of the present invention, the light source emits light having a single wavelength, i.e., UV light or blue-color light. By doing this, it is possible to convert the light having a single wavelength into light having desirable wavelengths; therefore, it is possible to improve efficiency in converting the light using the light converting section. Therefore, it is more possible to reduce loss in light than when using light sources for emitting light having various wavelengths. Also, by using the light source for emitting light having a single color (a single wavelength), lighting operation is possible for the color display.

Also, in the field sequential lighting device according to the present invention, colors converted by the light converting section may be: red (R), green (G), and blue (B).

In this aspect of the present invention, it is possible to realize light corresponding to colors, i.e., R, G, and B having desirable brightness and color reproducibility.

Also, in the field sequential lighting device according to the present invention, four or more primary colors may be converted by the light converting section.

In this aspect of the present invention, it is possible to realize light having four or more colors with desirable brightness and color reproducibility.

An image projecting device according to the present invention has the field sequential lighting device according to any one of the above aspects of the present invention.

In this aspect of the present invention, as explained above, the light emitted from the field sequential lighting device has desirable brightness and color reproducibility with high efficiency. Therefore, observers using the device are able to observe a projected image clearly.

DETAILED DESCRIPTION OF THE INVENTION

Figure 2:
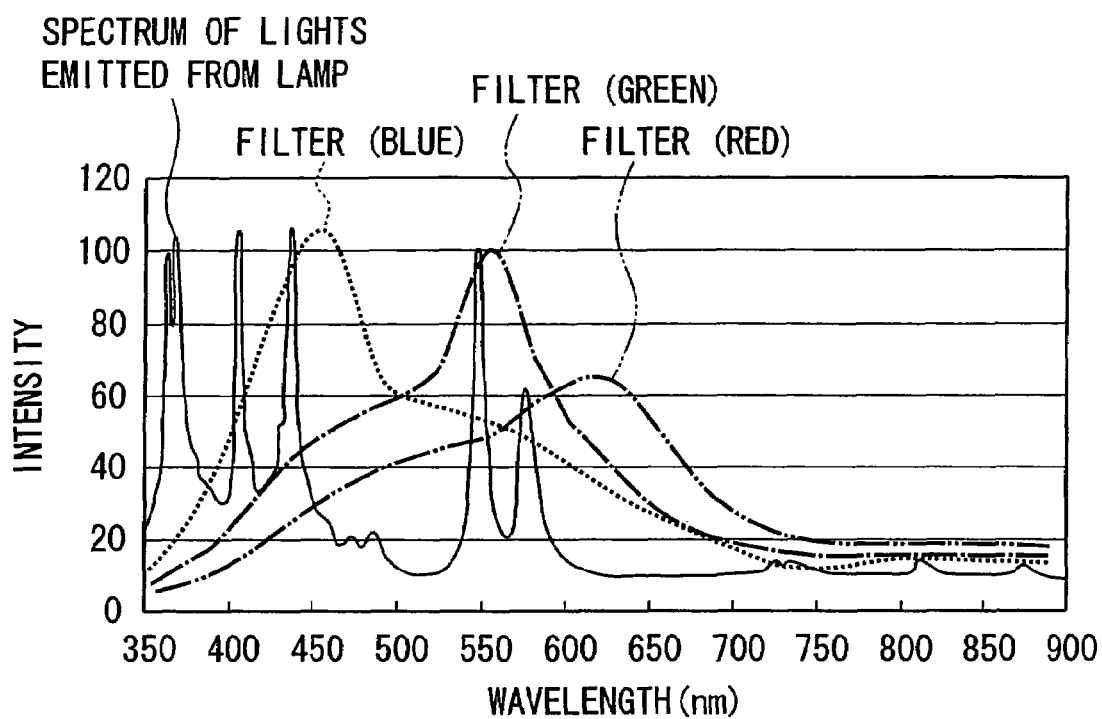
FIG. 2 is a graph showing a spectrum of light corresponding to a plurality of colors subsequent to projecting the ultra-high pressure mercury lamp through the light converting section.
Figure 3:
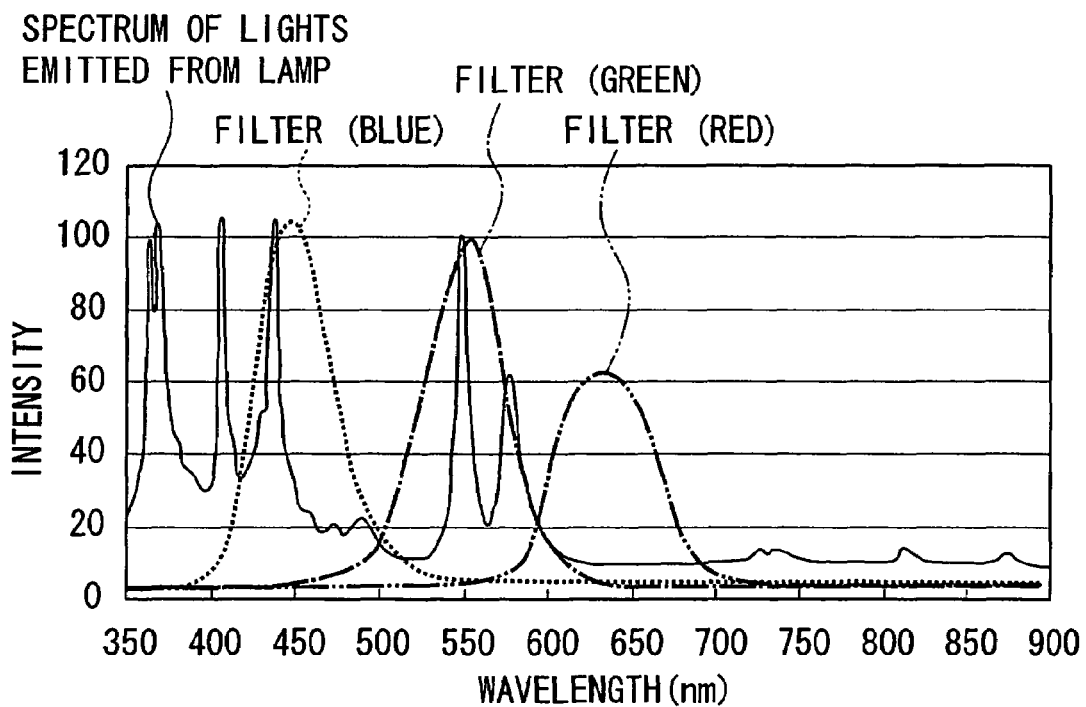
FIG. 3 is a graph showing a spectrum of lights subsequent to projecting from the ultra-high pressure mercury lamp through the light converting section and the color wheel.

An embodiment of the present invention is explained with reference to FIGS. 1 to 3.

Figure 1:
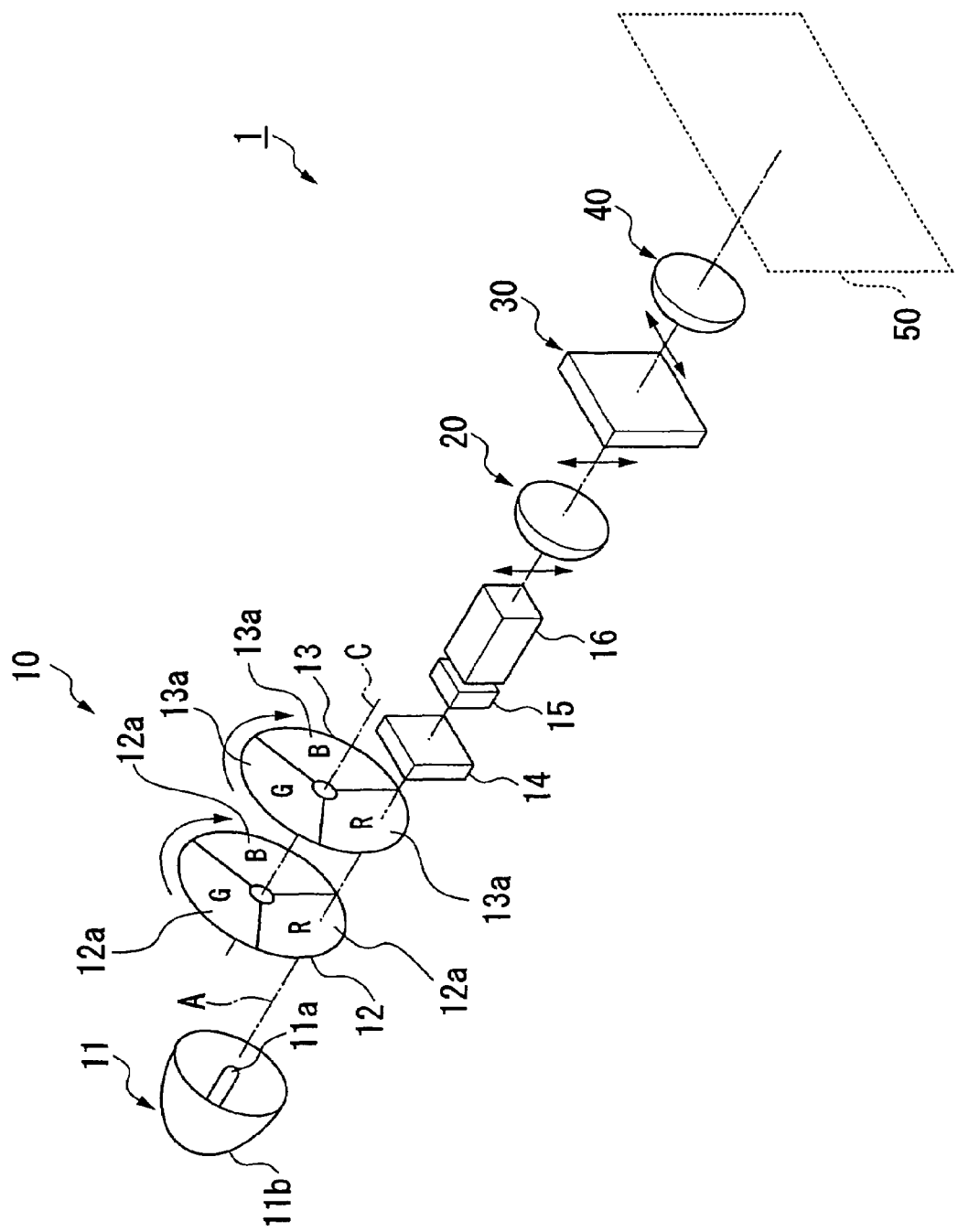
FIG. 1 is a perspective view showing a general structure of an embodiment of the image projecting device according to the present invention.

As shown in FIG. 1, an image projecting device according to the present embodiment includes: a lighting device (field sequential lighting device) 10; a lighting optical system 20 for emitting light onto a spatial modulating element 30 using the light emitted from the lighting device 10; and a projecting optical system 40 for projecting enlarged images modulated by the spatial modulating element 30 onto a screen 50. Reference symbol "A" indicates an optical axis of the image projecting device 1.

The above lighting device 10 includes: a light source 11 for emitting white light; a light converting section 12 for converting the light emitted from the light source 11 sequentially so that light corresponding to a plurality of colors (specific wavelengths) is intensified; a color wheel (color selecting section) 13, disposed between the light converting section 12 and the lighting optical system (an object to cause reception of the emitted light) 20, operable synchronously with (i.e., coinciding with) the light converting section 12 in terms of sequence; a UV-IR cutting filter 14, disposed between the color wheel 13 and the lighting optical system 20, for cutting out UV light and IR light; and a light-polarization converting element 15 disposed on a light-incident surface of an integrator rod 16.

The above light source 11 includes: a super-high pressure mercury lamp (discharging lamp) 11 disposed in a center of the light source; and a reflector mirror 11b disposed around the super-high pressure mercury lamp. The reflector mirror 11b is oval in cross section so that the light is condensed onto the light-polarization converting element 15. Also, as shown in FIG. 2, the light, including UV light and IR light, emitted from the ultra-high pressure mercury lamp 11a has a plurality of bright lines, which are unique to mercury, indicating intensities of the light corresponding to specific colors. Usually, coatings are formed on reflector mirrors so that light having a wavelength corresponding to UV light or IR light can be transmitted through the coatings. However, in the present embodiment, a coating which reflects light having any wavelength bandwidths is formed on the reflector mirror 11b.

The above light converting section 12, disposed in a plane facing in a propagation direction of the light emitted from the light source 11 (i.e., a plane of the color wheel 13 facing the light source 11), is formed by a circular plate having a rotational center axis C.

Also, the light converting section 12 includes a fluorescent material 12a. The fluorescent material 12a converts the emitted light so that intensities of the light, with respect to colors, i.e., red (R), green (G), and blue (B), emitted from the light source 11, are greater than the intensities of the non-converted light subsequent to being emitted from the light source 11. In other words, the converted light has bright lines shifted from the initial bright lines to different bright lines (i.e., the wavelengths are shifted). Also, optimal fluorescent materials 12a, formed on the color wheel 13 and corresponding to each color, i.e., red (R), green (G), and blue (B), are disposed to coincide with the corresponding filters disposed subsequent to the fluorescent materials 12a so as to emit the light, i.e., during the same period of time.

The above color wheel 13 has approximately the same shape as that of the fluorescent materials 12a so that each color filter 13a, into which the light is incident, is switched sequentially. By doing this, field sequential lighting operation is realized. Also, the color wheel 13 can purify the light corresponding to each color and increase the intensity of the light by transmitting the light emitted from the light converting section 12 through the color filters 13a corresponding to each color.

On the fluorescent materials 12a and the color filters 13a; red portions (R), green portions (G), and blue portions (B) are disposed so as to correspond with each other with respect to the rotational direction. Also, three portions corresponding to the colors are disposed so that the light converting section 12 and the color wheel 13 are divided into three sections.

The UV-IR cutting filter 14 is disposed subsequent to the light converting section 12 and the color wheel 13 so as to prevent the spatial modulating element 30 from being damaged by the transmission of UV light or heat generated by IR light.

The light polarization converting element 15 is disposed at a focal point of the lights emitted from the light source 11 so that the polarization directions of the light emitted from the light source 11 is aligned so as to form predetermined polarized light. That is, the light polarization converting element 15 is used for efficiently aligning the light incident into the spatial modulating element 30 with the incident polarizing direction of the spatial modulating element 30.

The integrator rod 16 eliminates unevenness of the light emitted from the light source 11.

The lighting optical system 20 emits light emitted from the integrator rod 16 onto the spatial modulating element 30 efficiently. Also, in the present embodiment, a transmissive liquid crystal light bulb is used as the spatial modulating element 30. Also, the screen 50 is used for observers to observe the enlarged image projected by the projecting optical system 40.

The UV-IR cutting filter 14, the light polarization converting element 15, and the integrator rod 16 may be replaced as long as any alternative members have the same functions as those members 14 to 16. Those members 14 to 16 are not indispensable basic members in the present invention; therefore, these members may be eliminated from the present invention. Also, it is not necessary to convert all the colors using the light converting section 12; that is, only a necessary color, e.g., red may be converted.

Next, projecting images on the screen 50 having the above structure using the image projecting device 1 according to the present embodiment is explained as follows.

Firstly, the light source 11 is activated so as to turn on the ultra-high pressure mercury lamp 11a. After that, a motor (not shown in the drawings) is driven so that a rotation shaft is rotated. By doing this, the light converting section 12 and the color wheel 13 rotate with respect to the direction shown in FIG. 1.

Figure 11:
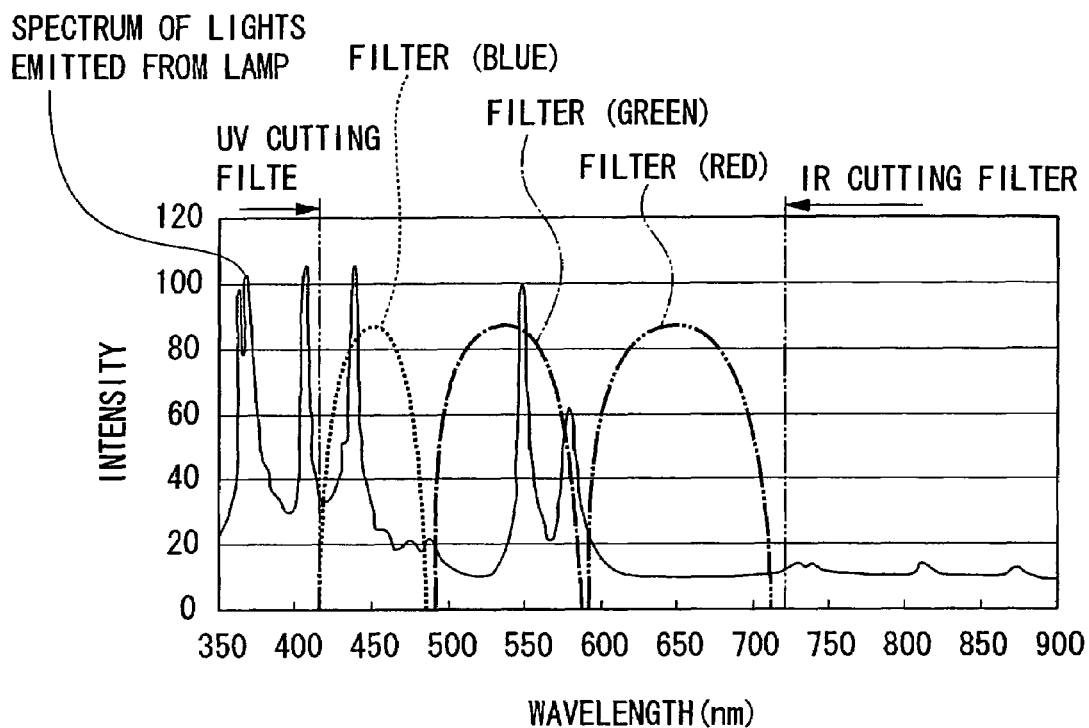
FIG. 11 is a graph showing a spectrum with respect to a relationship between conventional ultra-high pressure mercury lamps and color filters.

The light emitted from the ultra-high pressure mercury lamp 11a is reflected and emitted from the reflector mirror 11b with respect to a direction (toward a right-hand direction in FIG. 1 to viewers), after that, the emitted light is incident into the light converting section 12. Each fluorescent material 12a corresponding to a color, i.e., red (R), green (G), and blue (B) switch sequentially in this color order; therefore, the light having greater optical intensity is emitted from there in this order. That is, as shown in FIG. 2, in the light emitted from the light source 11 and transmitted through the fluorescent material (12a) corresponding to the red color in the light converting section 12, the light corresponding to the red portion of the spectrum is intensified. In the light emitted from the light source 11 and transmitted through the fluorescent material (12a) corresponding to the green color in the light converting section 12, the intensity of the green portion of the spectrum is intensified. In the lights emitted from the light source 11 and transmitted through the fluorescent material (12a) corresponding to the blue color in the light converting section 12, the intensity of the blue portion of the spectrum is intensified. As explained above, the light subsequent to transmitting through the fluorescent materials 12a corresponding to each color in the light converting section 12 are converted and emitted so that light corresponding to colors, i.e., R, G, and B, is intensified with respect to a spectrum of the light initially emitted from the light source. In addition, as shown in FIG. 3, spectrums of the light corresponding to the three colors, i.e., red (R), green (G), and blue (B) have acute peaks because the rest of the light is trimmed when the light transmit through the conventionally-used color wheel 13 shown in FIG. 11.

The light subsequent to being transmitted through the color filter 13 is incident into the UV-IR cutting filter 14 so that components at a wavelength 420 nm or less and components at a wavelength 720 nm or greater in the transmitted lights are cut out. By doing this, the light at a wavelength in a range of 420 nm and 720 nm is made incident into the light polarization converting element 15; thus, the polarization direction of the light is aligned. The light polarized in such a predetermined direction is incident into the integrator rod 16, and the incident light repeat total reflections between surfaces of the integrator rod 16. By doing this, unevenness with regard to the light is eliminated by the total reflection resembling multilight-source condition; thus, the light is emitted from an emitting-plane of the integrator rod 16. The light emitted from the integrator rod 16 is incident into the spatial modulating element 30 by the lighting optical system 20. The spatial modulating element 30 is modulated synchronously in accordance with inputted images and the light corresponding to each color. The modulated light is made incident into the projecting optical system 40, and thereby, enlarged images are projected on the screen 50 by the projecting optical system 40. The projected images are formed by the light emitted from the ultra-high pressure mercury lamp 11a; therefore, the observers can observe projected images having greater luminous energy. In particular, the color wheel 13 has three primary colors, i.e., red (R), green (G), and blue (B); therefore, the observers can observe projected images having greater luminous energy with respect to all of these primary colors.

Figure 12:
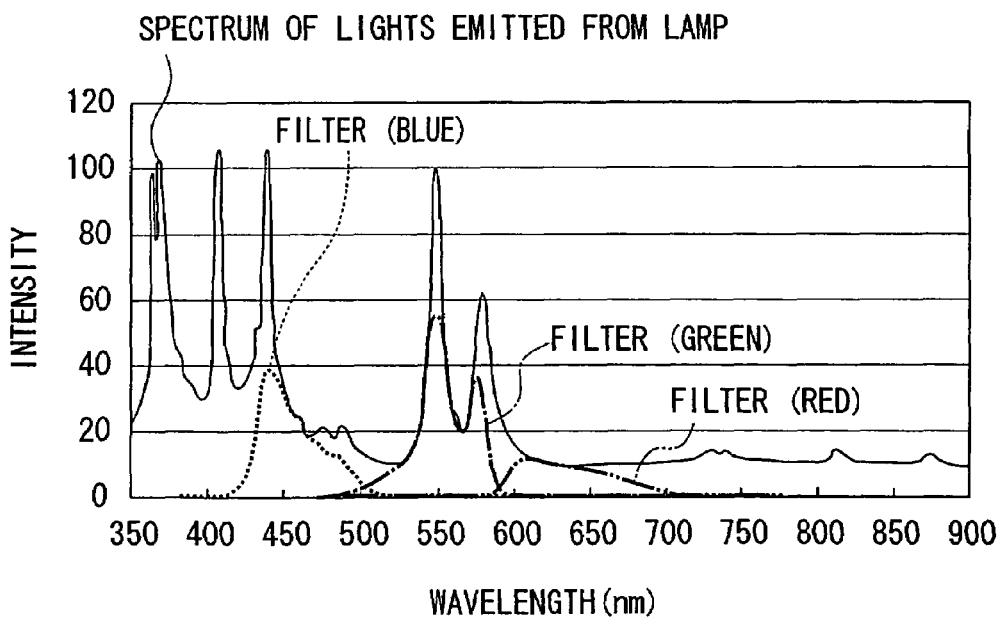
FIG. 12 is a graph showing a spectrum with respect to a relationship between wavelengths and intensities of the light subsequent to transmitting through the conventional color filters.

In the image projecting device 1 according to the present embodiment, the luminous energies of each color, i.e., R, G, and B, emitted from the light source 11 can be made use of effectively in the field sequential lighting operation by the light converting section 12; therefore, the light can be used efficiently. By doing this, the light, corresponding to a plurality of colors, emitted from the light converting section 12 can be intensified; therefore, the light has greater luminous energy, and it is possible to generate light having desirable color rendering properties. That is, the light has greater luminous energy particularly with respect to the red color than the light used in the conventional image projecting device shown in FIG. 12; therefore, it is possible to generate uniform light having desirable color reproducibility.

Here, a technical range of the present invention is not limited to the above embodiment; thus, various modifications can be added unless disturbing effects and structures of the present invention.

Figure 4:
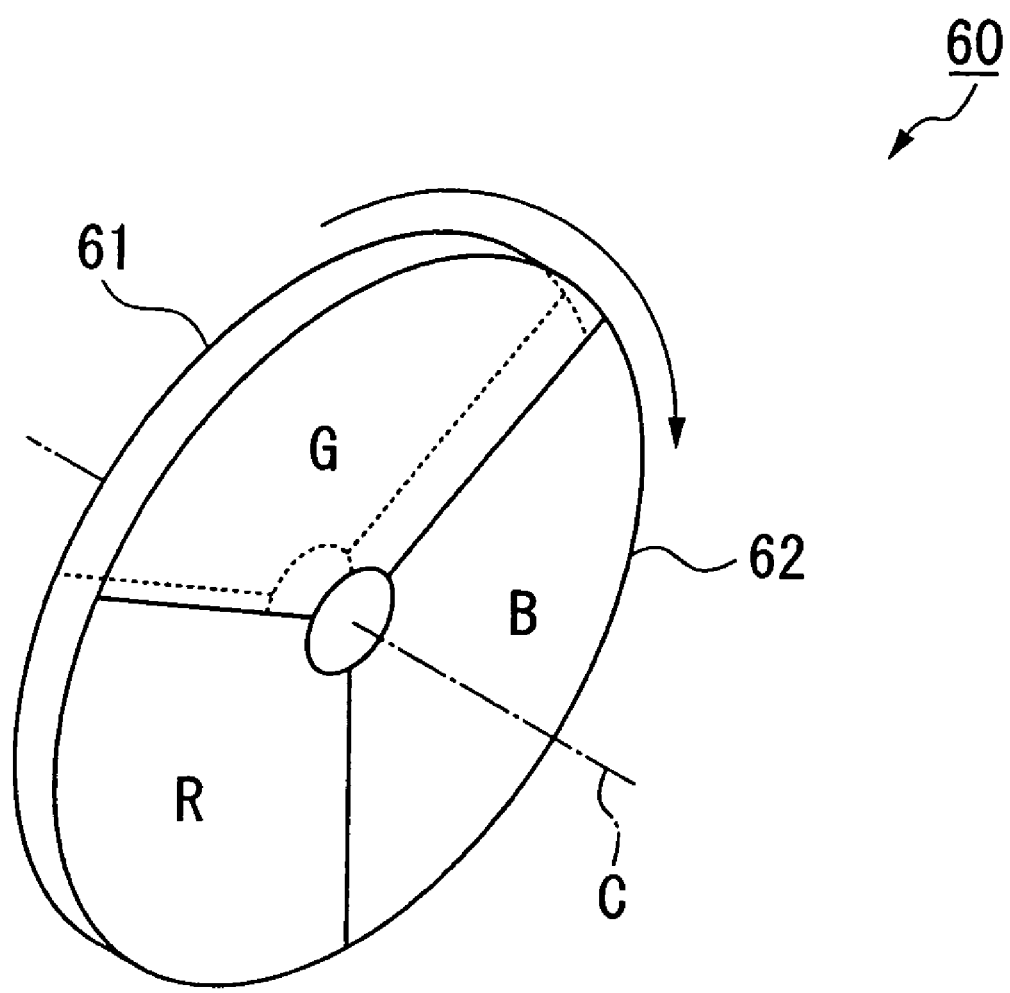
FIG. 4 is a perspective view of a modified embodiment of the light converting section and the color wheel shown in FIG. 1.

For example, in FIG. 1, the light converting section 12 and the color wheel 13 are separate circular plates. However, as shown in FIG. 4, the fluorescent materials for converting colors in the light may be disposed on a surface 61, facing the light source, of a circular glass plate 60, and the color filters may be formed on the other surface 62 of the circular glass plate 60. In such a structure, with respect to the disposition of each fluorescent material and each color filter, the colors, i.e., R, G, and B in the fluorescent materials and the color filters coincide on both sides of the circular glass plate 60, e.g., the fluorescent material for the red color and the color filter for the red color coincide on either side of the circular glass plate 60.

Figure 5:
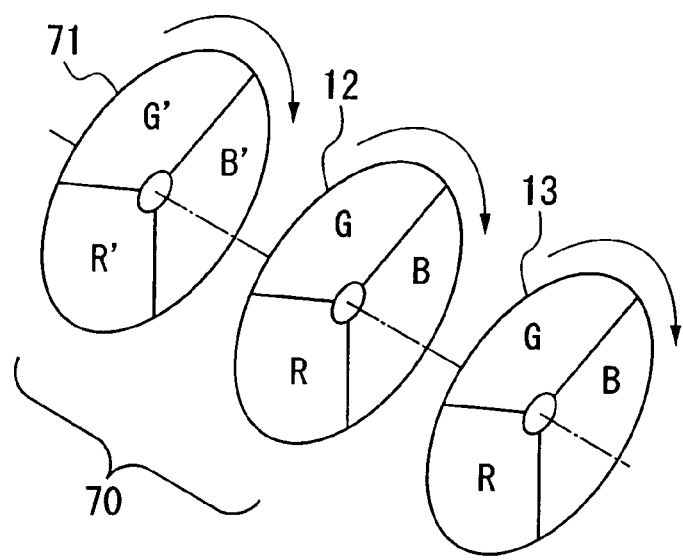
FIG. 5 is a perspective view of other modified embodiment of the light converting section and the color wheel shown in FIG. 1.

Also, as shown in FIG. 5, a light converting section 71 may be disposed for a light converting section 70 in addition to the light converting section 12. In such a structure, wavelengths in the light are converted by the light converting section 71 so that the light, emitted from the light source, having a specific color is intensified, e.g., red light (red color light) is generated so that the luminous energy in the light (having wavelengths in vicinity of red color light) is intensified. In addition, wavelengths in the converted light are further converted into the R light (red color light) by the light converting section 12. The light having converted wavelengths is trimmed by the color filter corresponding to the red color on the color wheel 13. By doing this, efficiency for converting the light corresponding to each color can be improved because there are provided a plurality of the light converting sections 12 so that the light emitted from the light source 11 is transmitted through light converting sections several times. Also, instead of converting the light in the vicinity of the red color light into red color light using the light converting section 71, the additional light converting section 71 may convert the lights emitted from the light source 11 into B light (blue color lights) and the light converting section 12 convert the light emitted from the light converting section 71 into red light (red color light), i.e., conversion may be conducted between two colors having opposing properties.

Figure 6:
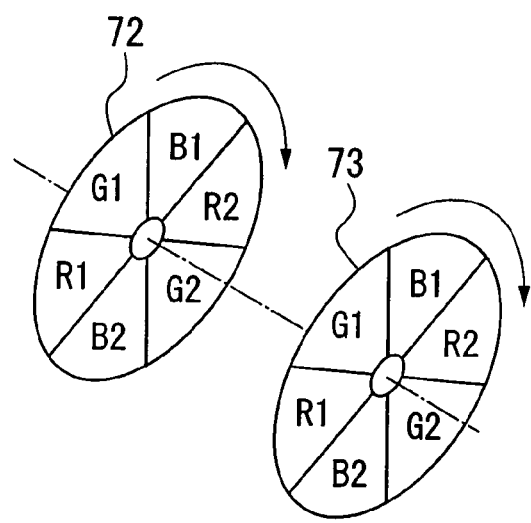
FIG. 6 is a perspective view of yet other modified embodiment of the light converting section and the color wheel shown in FIG. 1.

In the present embodiment, three colors are disposed in three divided sections on the light converting section 12 and the color wheel 13. However, as shown in FIG. 6, six colors, e.g., R1 (red color), R2 (red color different from R1), G1 (green color), G2 (green color different from G1), B1 (blue color), and B2 (blue color different from B1), may be disposed on the light converting section 72 and the color wheel 73. As explained above, if the field sequential lighting operation is conducted using four or more primary colors, it is possible to generate four or more types of light having desirable brightness and color rendering properties.

Figure 7:
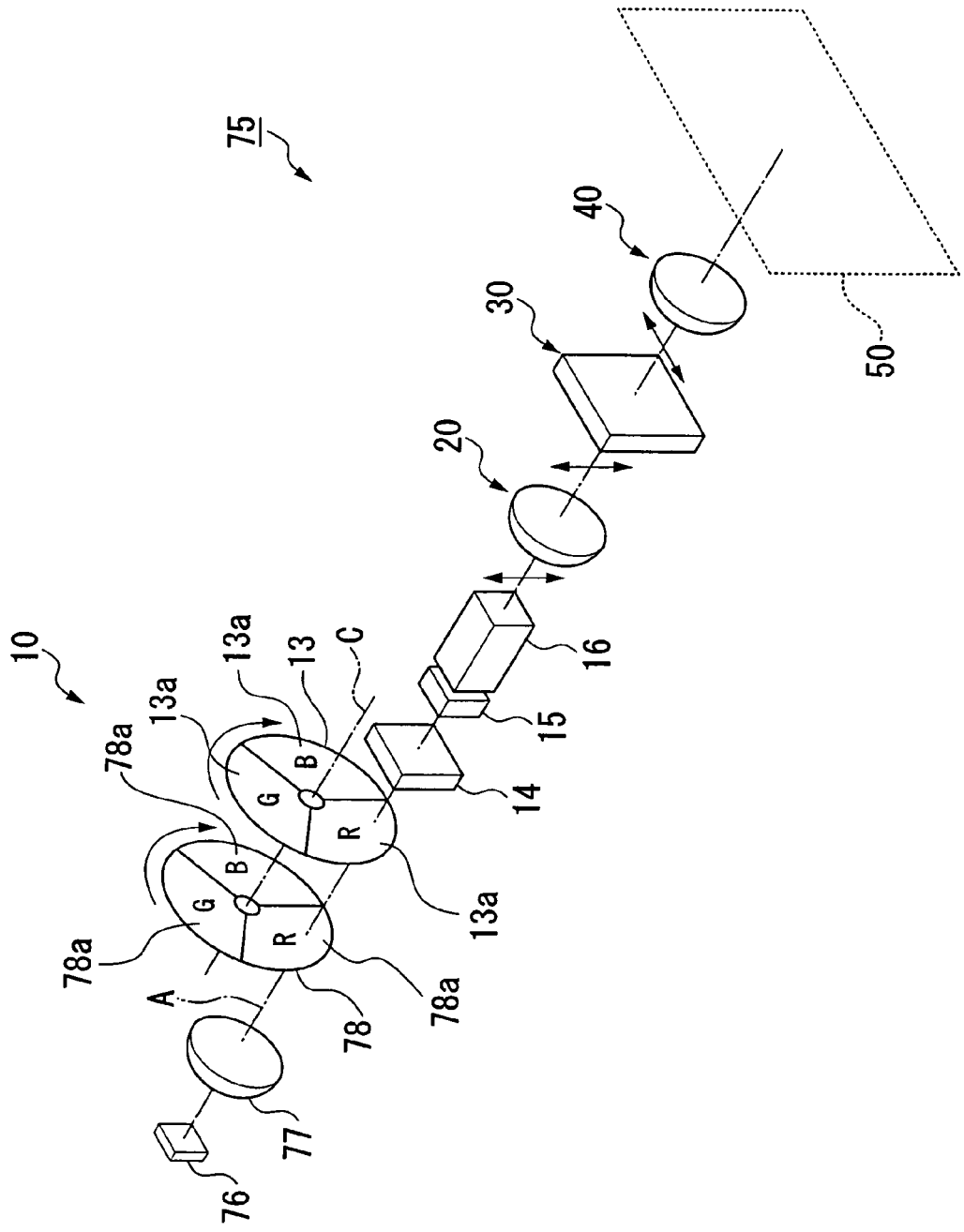
FIG. 7 is a perspective view showing a general structure of a modified embodiment of the image projecting device shown in FIG. 1.

Also, as shown in FIG. 7, an image projecting device 75 may have a light source 11 for emitting light having a single wavelength, i.e., a UV-LED 76 for emitting UV light. If the UV-LED 76 is used, the image projecting device 75 has a light concentrating optical system 77 for concentrating the light emitted from the UV-LED 76 onto the light polarization converting element 15. In such a case, a light converting section 78 is formed by fluorescent materials 73a for converting UV light wavelength components emitted from the UV-LED 76 into RGB light wavelength components. In such a case, Blue-LEDs and UV lamps may be used for the light source for emitting a single wavelength. As explained above, it is possible to improve efficiency in converting colors corresponding to the light using the fluorescent materials if the light source is of a type with single wavelength emission. Therefore, it is more possible to prevent loss of the light than in the case in which the light source emits light having various wavelengths. Also, it is possible to realize color lighting operation if a light source which emits a single color (single wavelength) is used. In addition, it is possible to adjust colors by changing the fluorescent materials.

In addition, in the above explanations, ratios of red (R), green (G), and blue (B) are equal in the light converting sections 12, 70, 72, and 78, and the color filter 13. However, the ratios may be varied in accordance with necessities. For example, in order to display color images, the green color needs luminous energy the most. The red color needs luminous energy next to that of the green color. Therefore, color distribution in the color filter may be arranged so that the ratio of the green color is the largest, and ratios of the red color and the blue color follow accordingly. By varying the ratios of areas corresponding to the colors, it is possible to optimize the white balance.

The light converting section 12 may be able to convert either one of UV light and the IR light into visible light. For example, a material, e.g., LUMILASS produced by Sumita Optical Glass Inc. may be used as the fluorescent materials for forming the light converting section 12 because this material can convert UV light into the visible light and intensify the converted visible light while maintaining the intensity of the visible light emitted from the light source 11. Also, YAG-LASS produce by Sumita Optical Glass Inc. can be used. This material is made by extracting crystals of fluorescent materials which can convert IR light into visible light highly efficiently in an oxide glass perform. The YAGLASS can convert IR light into visible light; therefore, light emitted from the light source 11 can be made use of with no waste.

Figure 8:
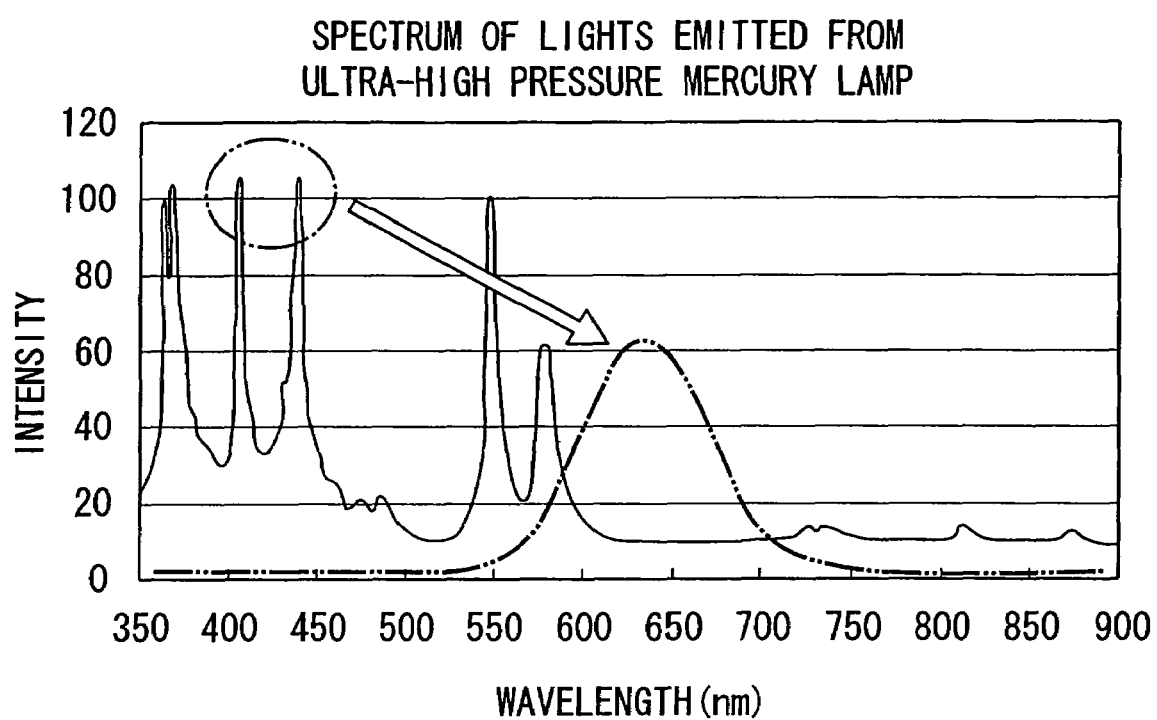
FIG. 8 is a graph showing a spectrum of light subsequent to converting light using fluorescent material different from the fluorescent material used in the embodiment shown in FIG. 1.

Also, in order to select the fluorescent materials for forming the light converting section 12, the fluorescent material may be able to convert the blue components in the visible light into red components. More specifically, for example, light, having a wavelength of 400 to 450 nm, emitted from the ultra-high pressure mercury lamp 11a may be converted into light having a central wavelength of approximately 630 nm. Such fluorescent materials for converting blue colors into red colors are used for color conversion in color organic EL devices. Not only the fluorescent materials for converting blue light (visible light) into red light (visible light) as shown in FIG. 8, but also fluorescent materials for converting green colors into red colors may be used for such fluorescent materials.

Figure 9:
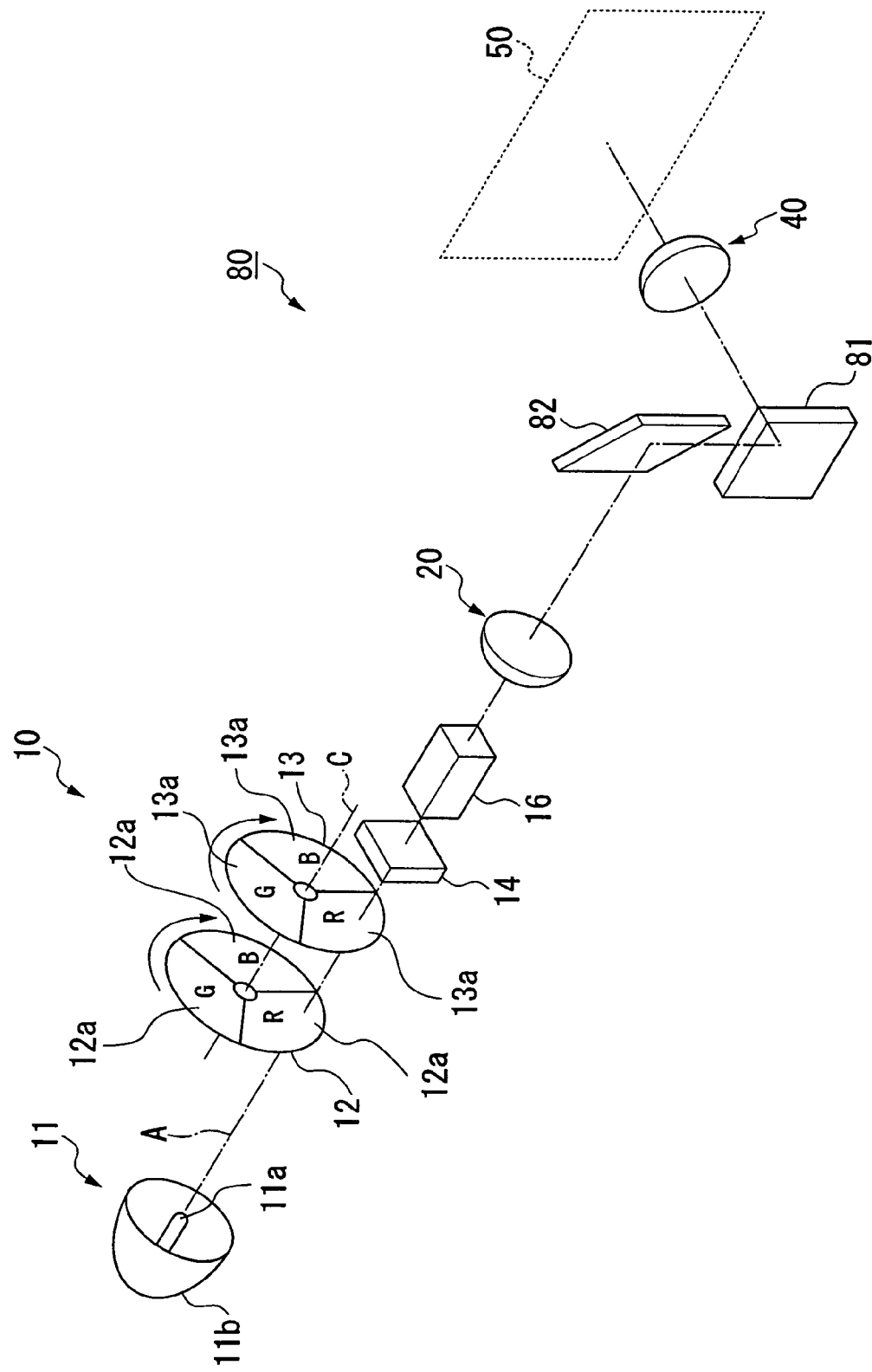
FIG. 9 is a perspective view showing a general structure of another modified embodiment of the image projecting device shown in FIG. 1.

Also, instead of the spatial modulating element 30 shown in FIG. 1, an image projecting device 80 may be provided with a DMD (digital micro mirror device) 81 as shown in FIG. 9. In such a case, the polarization converting elements 15 are not necessary because the DMD 81 does not reflect the polarized light. Instead of that, a mirror 82 for reflecting the light emitted from the lighting optical system 20 toward the DMD 81 is disposed. In such a structure, the DMD 81 is modulated in accordance with the inputted images so that an angle of the DMD 81 is changed by controlling the ON/OFF state of a micro-movement mirror corresponding to colors included in the inputted images; thus, the light is made incident into the projecting optical system 40. By doing this, the optimal images can be incident into the projecting optical system 40. In addition, the images are projected onto the screen 50 by the projecting optical system 40. In such a structure, the same effects can be realized as the case in which the spatial modulating element 30 is used. The image projecting device 80 is operable without the UV-IR cutting filter 14 and the integrator rod 16.

Figure 10:
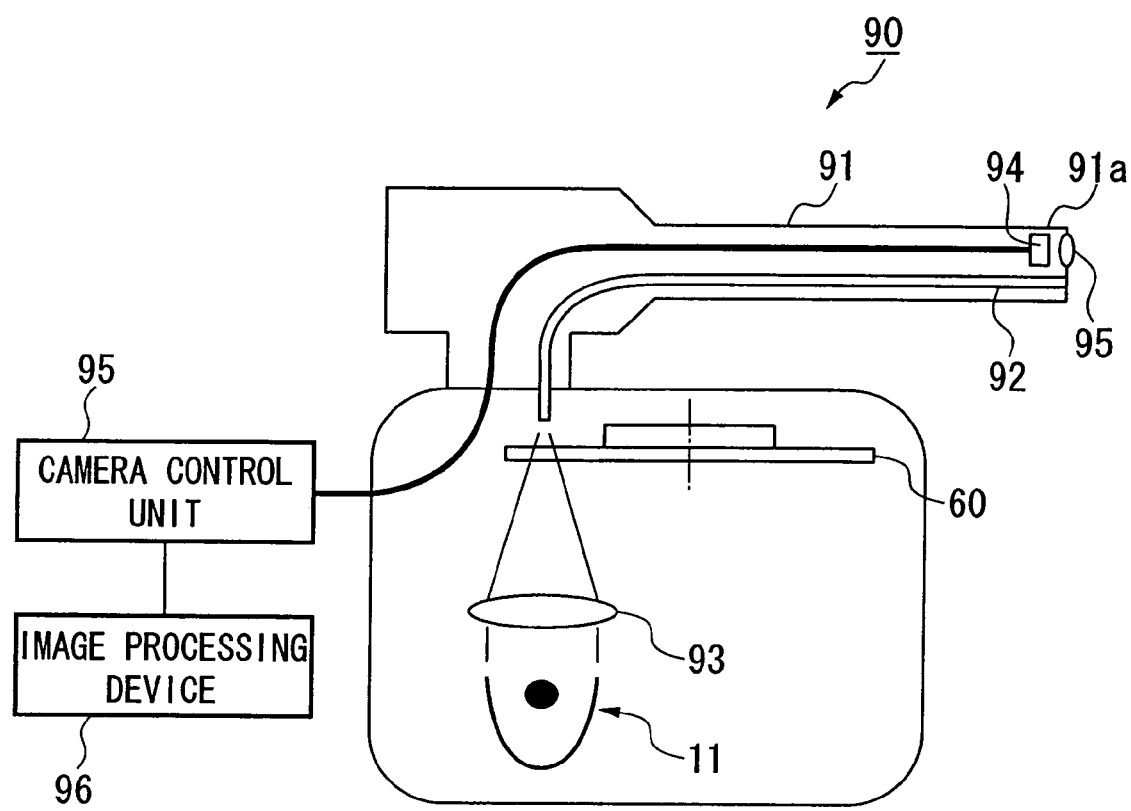
FIG. 10 is a schematic view showing a general structure of a device using the field sequential lighting method.

Also, the device using the field sequential lighting operation can be used for capturing images using the field sequential method. For example, an endoscope 90 shown in FIG. 10 can be made. The endoscope 90 is provided with a light guide 92 for introducing the light emitted from the light source 11 toward a tip section 91a of an inserting section 91 through which the tip section 91a reaches a section to be observed. Also, as shown in FIG. 4, the circular glass plate 60 is disposed between the light source 11 and the light guide 92. In such a structure, the white light emitted from the light source 11 is concentrated on an end surface of the light guide 92 by a light concentrating optical system 93 so that the condensed light is introduced to the tip section 91a of the inserting section 91 by the light guide 92. The object (not shown in the drawings) to be observed can receive light including a plurality of colors emitted from the light guide 92; and thereby, images of the object to be observed receiving the field sequential lights are captured by a CCD 94 via an object lens 95. In this case, timing for emitting the light corresponding to each color and timing for capturing the images is synchronized by a camera control unit 95. In addition, the captured images are treated by an image treating device 96 based on data captured with respect to a plurality of colors; therefore, color images can be captured. It is possible to realize the field sequential lighting operation while reducing loss in the light by using the glass circular plate 60. Also, it is possible to realize a lighting device for capturing images while realizing efficient use of the light and easy set-up of the colors included in the light.

In addition, it is easy to realize a field sequential lighting operation using four or more primary colors by using the light converting section 72 and the color wheel 73 shown in FIG. 6. Also, the light converting section 12 and a color wheel 13 similar to that of the first embodiment may be used instead of the circular glass plate 60.

The present invention has the following effects.

In the field sequential lighting device according to the present invention, the light emitted from the light source and transmitted through the light converting section is intensified in the field sequential lighting operation; therefore, light having greater luminous energies can be emitted from the light source. Thus, it is possible to generate light having desirable color rendering properties.

Also, in the image projecting device according to the present invention, highly efficient light having the above explained brightness (luminous energies) and desirable color rendering properties can be generated; therefore, it is possible for the observers to observe clear projected images.

What is claimed is:

1. A field sequential lighting device for emitting light corresponding to a plurality of colors using a field sequential method, the field sequential lighting device comprising:
   a light source which emits a light; and
   a light converting section which comprises a plurality of fluorescent materials which convert wavelengths of the light emitted from the light source sequentially so that light corresponding to the plurality of colors is intensified by switching the plurality of the fluorescent materials sequentially.

2. A field sequential lighting device according to claim 1, further comprising a color selecting section disposed between the light converting section and an object to cause reception of the emitted light, the color selecting section being operable synchronously with the light converting section.

3. A field sequential lighting device according to claim 2, wherein the colors included in the light converted by the light converting section and the colors selected by the color selecting section coincide.

4. A field sequential lighting device according to claim 1, wherein an emission spectrum in the light emitted from the light source has specific bright lines, and the specific bright lines are converted into other bright lines by the light converting section.

5. A field sequential lighting device according to claim 4, wherein
   the light source emits UV light, visible light, and IR light, and
   the light converting section converts at least either one of the UV light and the visible light into different visible light.

6. A field sequential lighting device according to claim 4, wherein the light converting section converts predetermined visible light having the plurality of colors into visible light having colors different from those of the unconverted predetermined visible light.

7. A field sequential lighting device according to claim 6, wherein the light source is a discharging lamp having a plurality of bright lines.

8. A field sequential lighting device according to claim 4, wherein the light source emits light having a single wavelength.

9. A field sequential lighting device according to claim 8, wherein the light source emits UV light.

10. A field sequential lighting device according to claim 8, wherein the light source emits blue-color light.

11. A field sequential lighting device according to claim 4, wherein the colors converted by the light converting section are: red (R), green (G), and blue (B).

12. A field sequential lighting device according to claim 4, wherein the colors converted by the light converting section are four or more.

13. An image projecting device having the field sequential lighting device according to claim 1.

14. A field sequential lighting device for emitting light corresponding to a plurality of colors using a field sequential method, the field sequential lighting device comprising:
   a light source;
   a light converting section for intensifying the emitted light by sequentially converting the light, emitted from the light source, corresponding to the plurality of colors; and
   a color selecting section disposed between the light converting section and an object to cause reception of the emitted light, the color selecting section being operable synchronously with the light converting section,
   wherein the light converting section is provided with a fluorescent material which converts the wavelengths of the light.

15. A field sequential lighting device according to claim 14, wherein the colors included in the light converted by the light converting section and the colors selected by the color selecting section coincide.

16. A field sequential lighting device according to claim 14, wherein an emission spectrum in the light emitted from the light source has specific bright lines, and the specific bright lines are converted into other bright lines by the light converting section.

17. A field sequential lighting device according to claim 16, wherein
   the light source emits UV light, visible light, and IR light, and
   the light converting section converts at least either one of the UV light and the visible light into different visible light.

18. A field sequential lighting device according to claim 16, wherein the light converting section converts predetermined visible light having the plurality of colors into visible light having colors different from those of the unconverted predetermined visible light.

19. A field sequential lighting device according to claim 18, wherein the light source is a discharging lamp having a plurality of bright lines.

20. A field sequential lighting device according to claim 16, wherein the light source emits light having a single wavelength.

21. A field sequential lighting device according to claim 20, wherein the light source emits UV light.

22. A field sequential lighting device according to claim 20, wherein the light source emits blue-color light.

23. A field sequential lighting device according to claim 16, wherein the colors converted by the light converting section are: red (R), green (G), and blue (B).

24. A field sequential lighting device according to claim 16, wherein the colors converted by the light converting section are four or more.

25. An image projecting device having the field sequential lighting device according to claim 14.

* * * * *